United States Patent
Irvin et al.

(10) Patent No.: US 11,207,634 B2
(45) Date of Patent: Dec. 28, 2021

(54) APPARATUS AND METHOD FOR RECOVERING AN AMINE SOLVENT FROM AN ACID GAS STREAM

(71) Applicant: University of Kentucky Research Foundation, Lexington, KY (US)

(72) Inventors: Bradley David Irvin, Lexington, KY (US); Amanda Warriner, Lexington, KY (US); Leland R. Widger, St. Clair, MI (US); Kunlei Liu, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 362 days.

(21) Appl. No.: 16/460,229

(22) Filed: Jul. 2, 2019

(65) Prior Publication Data
US 2020/0001227 A1    Jan. 2, 2020

Related U.S. Application Data

(60) Provisional application No. 62/693,082, filed on Jul. 2, 2018.

(51) Int. Cl.
*B01D 47/06* (2006.01)
*B01D 47/14* (2006.01)
(Continued)

(52) U.S. Cl.
CPC ......... *B01D 53/1475* (2013.01); *B01D 47/06* (2013.01); *B01D 47/14* (2013.01);
(Continued)

(58) Field of Classification Search
CPC ........ B01D 2252/103; B01D 2252/204; B01D 2252/60; B01D 2257/504;
(Continued)

(56) References Cited

U.S. PATENT DOCUMENTS

| 4,180,548 A | 12/1979 | Say et al. |
| 4,259,301 A | 3/1981 | Say |

(Continued)

FOREIGN PATENT DOCUMENTS

| EP | 2551007 A1 | 1/2013 |
| EP | 2963107 A1 | 1/2016 |

(Continued)

OTHER PUBLICATIONS

Google water wash amine nucleation agent scrubber (Year: 2021).*
English machine translation of EP2551007.

*Primary Examiner* — Cabrena Holecek
(74) *Attorney, Agent, or Firm* — Stites & Harbison PLLC; Warren D. Schickli

(57) ABSTRACT

A method and apparatus are provided for recovering an amine solvent from an acid gas stream. The apparatus includes a water wash recovery column, a nozzle for spraying water wash and an amine nucleation agent into the water wash recovery column and an inlet port for introducing acid gas into the water wash recovery column adjacent the lower end thereof. The method includes the steps of treating the acid gas stream in the water wash recovery column with a counter-current flow of water wash in an amine nucleation agent, discharging treated acid gas from an upper end of the water wash recovery column and collecting water wash, amine nucleation agent and entrained amine solvent from the acid gas stream and a sump at a lower end of the water wash recovery column.

19 Claims, 4 Drawing Sheets

(51) Int. Cl.
*B01D 53/00* (2006.01)
*B01D 53/14* (2006.01)
*B01D 53/78* (2006.01)
*B01D 53/96* (2006.01)

(52) U.S. Cl.
CPC ....... *B01D 53/002* (2013.01); *B01D 53/1425* (2013.01); *B01D 53/1493* (2013.01); *B01D 53/78* (2013.01); *B01D 53/96* (2013.01); *B01D 2252/204* (2013.01); *B01D 2257/504* (2013.01); *B01D 2258/0283* (2013.01)

(58) Field of Classification Search
CPC ...... B01D 2257/704; B01D 2258/0283; B01D 47/06; B01D 47/14; B01D 53/002; B01D 53/1425; B01D 53/1475; B01D 53/1487; B01D 53/1493; B01D 53/78; B01D 53/96; Y02C 20/40
See application file for complete search history.

(56) References Cited

U.S. PATENT DOCUMENTS

| | | |
|---|---|---|
| 4,287,161 A | 9/1981 | Agrawal |
| 4,292,286 A | 9/1981 | Say et al. |
| 4,313,917 A | 2/1982 | Ohta |
| 4,353,715 A | 10/1982 | Mir et al. |
| 4,477,419 A | 10/1984 | Pearce et al. |
| 5,277,822 A | 1/1994 | Higgins |
| 7,316,737 B2 | 1/2008 | Mimura et al. |
| 8,377,173 B2 | 2/2013 | Chuang |
| 8,420,038 B2 | 4/2013 | England |
| 8,486,358 B2 | 7/2013 | Lemaire |
| 8,603,226 B2 | 12/2013 | Garcia Andarcia et al. |
| 9,155,990 B2 | 10/2015 | Graff et al. |
| 9,238,191 B2 | 1/2016 | Nagayasu et al. |
| 9,283,496 B2 | 3/2016 | Laricchia et al. |
| 9,314,734 B2 | 4/2016 | Baburao et al. |
| 9,399,188 B2 | 7/2016 | Miyamoto et al. |
| 9,694,317 B2 | 7/2017 | Littleford et al. |
| 2014/0241967 A1 | 8/2014 | Fujita et al. |
| 2015/0314235 A1 | 11/2015 | Kortunov et al. |
| 2016/0082384 A1 | 3/2016 | Li et al. |
| 2016/0114283 A1 | 4/2016 | Okamoto et al. |
| 2017/0216763 A1 | 8/2017 | Widger et al. |
| 2017/0232380 A1 | 8/2017 | Widger et al. |
| 2018/0079660 A1* | 3/2018 | Widger .............. B01D 53/1475 |
| 2018/0104642 A1 | 4/2018 | Mabrouk et al. |

FOREIGN PATENT DOCUMENTS

| | | |
|---|---|---|
| WO | WO2012038865 A1 | 3/2012 |
| WO | WO2012038866 A1 | 3/2012 |

* cited by examiner

APPARATUS AND METHOD FOR RECOVERING AN AMINE SOLVENT FROM AN ACID GAS STREAM

RELATED APPLICATION

This application claims priority to U.S. Provisional Patent Application 62/693,082 filed Jul. 2, 2018, which is hereby incorporated by reference in its entirety.

GOVERNMENT SUPPORT

This invention was made with government support under Grant Nos. DE-FE0007395 and DE-FE00012926 awarded by the Department of Energy. The government has certain rights in the invention.

TECHNICAL FIELD

This document relates generally to a new and improved apparatus and method for recovering an amine solvent from an acid gas stream.

BACKGROUND

The cleaning of acid gases or sour gas, such as carbon dioxide in particular, from natural gas and in oil refining has been an extensively practiced technology. The industrial removal of carbon dioxide from natural gas dates back to the 1930's.

In the 21$^{st}$ century, due to the potential impact of anthropogenic carbon dioxide emissions on the climate, post-combustion carbon dioxide capture has gained tremendous attention. While several technologies exist for the removal of acid gases, one of the most commonly employed practices is the use of aqueous amines. Of these amines, tertiary amines are often used for natural gas applications due to their low energy of regeneration. Per post-combustion carbon dioxide capture applications, primary and secondary amines tend to be in part favoured by their faster rate and the low carbon dioxide driving force condition. Regardless of the application, the mass transfer rate in the absorber column dictates the size of the column (capital cost) used and, consequently, has a substantial impact on the overall process cost.

An apparatus depicting a thermal swing process for capturing carbon dioxide from flue gas is presented in FIG. 1. An aqueous amine solution is circulated between the absorber/absorption tower 10 and the stripper 12. The flue gas or acid gas, containing carbon dioxide enters the bottom of the absorber 10 at 14 while the aqueous amine absorbent enters the top of the absorber at 16 in counter-current flow to the acid gas. As the acid gas and the amine absorbent come into contact in the absorber 10, the absorbent removes the carbon dioxide from the gas stream. The amine solution, now rich in carbon dioxide, is discharged from the bottom of the absorber 10 and passed (note action arrow 18) through the heat exchanger 20 to improve efficiency before entering the top of the stripper 12 (note action arrow 22) where the amine solution is heated to a higher temperature. The stripper 12 removes the carbon dioxide as a gas from the amine solution. The carbon dioxide is passed through the condenser 24 and separated from water at the separator 26. The CO$_2$ is then subjected to downstream processing or storage while the water is returned to the stripper (note action arrow 25). The carbon dioxide lean amine solution exits the bottom of the stripper (note action arrow 27) and is returned to the absorber 10 by way of the heat exchanger 20 and the chiller 28.

The treated acid gas or flue gas is discharged from the absorber 10 at the action arrow 30. Significantly, as the acid gas/flue gas is treated in the absorber 10 it has a tendency to pick up some of the carbon dioxide scrubbing amine solution and carries it out in the process exhaust in the form of aerosols and entrained vapor. Over time these losses need to be made up with new amine solvent, thus increasing operational costs.

This document is related to a new and unique apparatus and method adapted to increase efficiency and recovery of amine solvent from the process exhaust 30 discharged from the absorber 10.

SUMMARY

In accordance with the purposes and benefits described herein, a new and improved method is provided for recovering an amine solvent from an acid gas stream such as a flue gas stream. That method comprises the steps of: (a) treating the acid gas stream in a water wash recovery column with a counter-current flow of wash water and an amine nucleation agent, (b) discharging treated acid gas from an upper end of the water wash recovery column and (c) collecting wash water, amine nucleation agent and entrained amine solvent from the acid gas stream in a sump at a lower end of the recovery column.

The method may include using as the amine nucleation agent an activated carbon having a density of 997 kg/m$^3$+/− 600 kg/m$^3$ and a diameter of less than 1.0 mm.

The method may include recirculating the wash water, amine nucleation agent and entrained amine solvent in a sump to prevent the amine nucleation agent from settling and clumping. Further, the method may include periodically draining the wash water, the amine nucleation agent and the entrained amine solvent from the sump.

Still further, the method may include separating the amine nucleation agent from the wash water and the entrained amine solvent. This may be accomplished by use of a separating element and the method may further include the step of removing buildup of the nucleation agent on the separator element with a fluid stream. That fluid stream may be selected from a group including a water stream, an airstream or a combination thereof.

In addition, the method may include the further step of delivering the wash water and entrained amine solvent to an absorber tower where the amine solvent captures carbon dioxide from the acid gas stream. Further, the method may include the step of returning the amine nucleation agent to the water wash recovery column. In at least one of the many possible embodiments, the method may include using activated carbon of less than 35 mesh as the amine nucleation agent. Further, the method may include the step of using up to 15 weight percent activated carbon in the wash water.

In accordance with an additional aspect, a new and improved apparatus is provided for recovering an anime solvent from an acid gas stream. That apparatus comprises (a) a water wash recovery column including a treated acid gas discharge port at an upper end and a sump at a lower end, (b) a nozzle in the water wash recovery column spraying water wash and an amine nucleation agent into the water wash recovery column adjacent the upper end thereof and (c) an inlet port introducing acid gas to the water wash recovery column adjacent the lower end thereof whereby (1) a counter-current flow is established between the acid gas introduced through the inlet port and the water wash and amine nucleation agent spray from the nozzle, (2) water wash, amine nucleation agent and entrained amine solvent is collected in the sump and (3) treated acid gas is discharged through the acid gas discharge port.

The apparatus may further include a sump recirculation circuit. That sump recirculation circuit may include a pump recirculating the water wash, the amine nucleation agent and the entrained amine solvent in the sump to prevent the amine nucleation agent from clumping and settling.

The apparatus may further include a separating circuit. That separating circuit may include a separating element that separates the amine nucleation agent from the wash water and the entrained amine solvent. Further, the apparatus may include an amine nucleation agent return circuit that returns the separated amine nucleation agent from the separating element to the water wash recovery column.

In addition, the apparatus may further include a water wash and entrained amine solvent return circuit that delivers the water wash and entrained solvent separated from the amine nucleation agent at the separating element to a downstream absorber tower where the amine solvent strips carbon dioxide from the acid gas.

The amine nucleation agent may have a density of 997 kg/m$^3$+/1 600 kg/m$^3$ and a diameter less than 1 mm. Further, the amine nucleation agent may be provided at up to 15 weight percent in the water wash. In addition, the amine nucleation agent may be an activated carbon of less than 35 mesh. In some of the many possible embodiments, the amine nucleation agent may be an activated carbon of about 325 mesh.

In the following description, there are shown and described several preferred embodiments of the method and apparatus for recovering an amine solvent from an acid gas stream. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof.

Reference will now be made in detail to the present preferred embodiments of the apparatus and method, examples of which are illustrated in the accompanying drawing figures.

DETAILED DESCRIPTION

Figure 1:
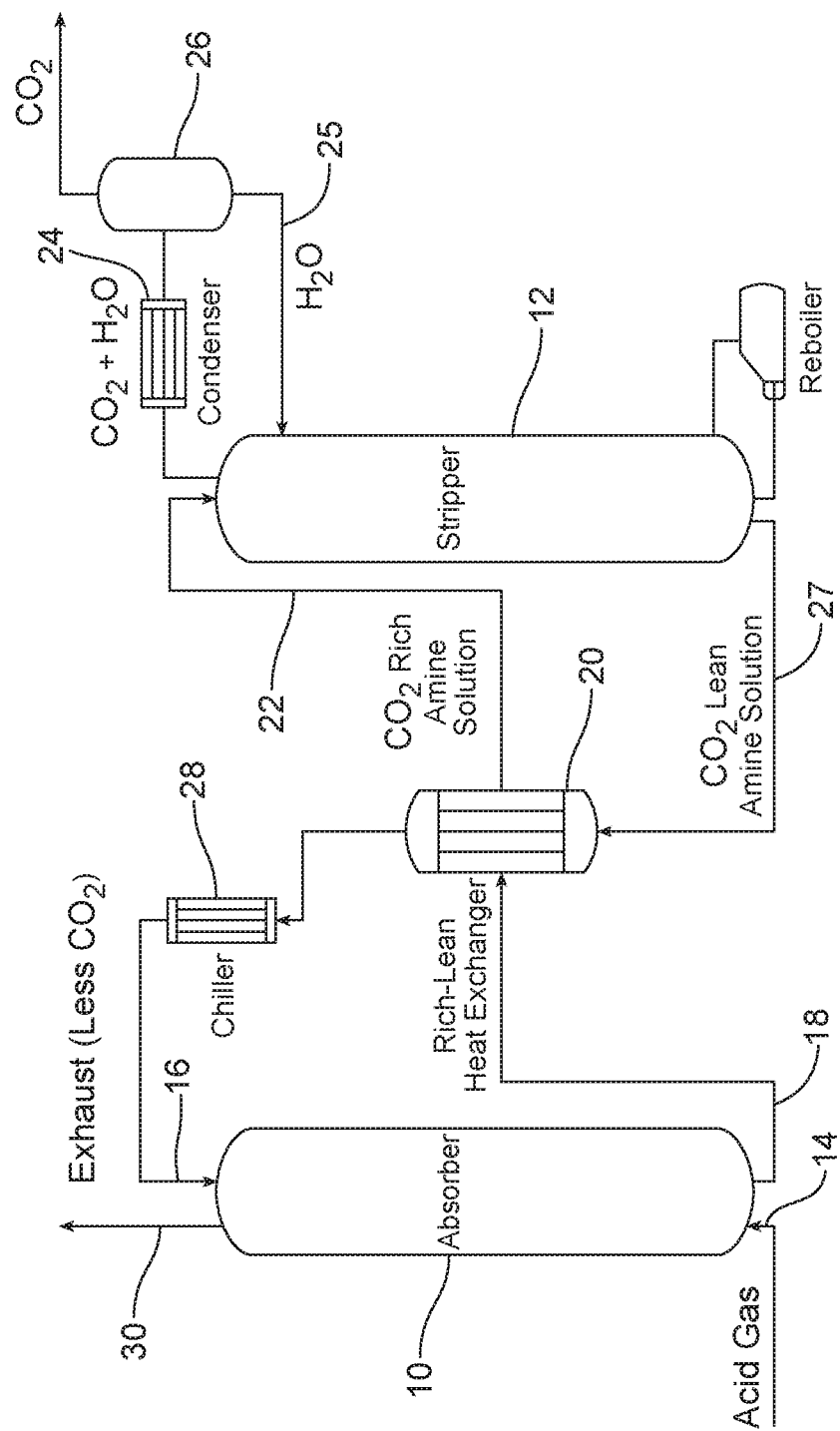
FIG. 1 is a schematic block diagram of an apparatus utilized in a post-combustion carbon dioxide capture process using aqueous amine solvent.
Figure 2:
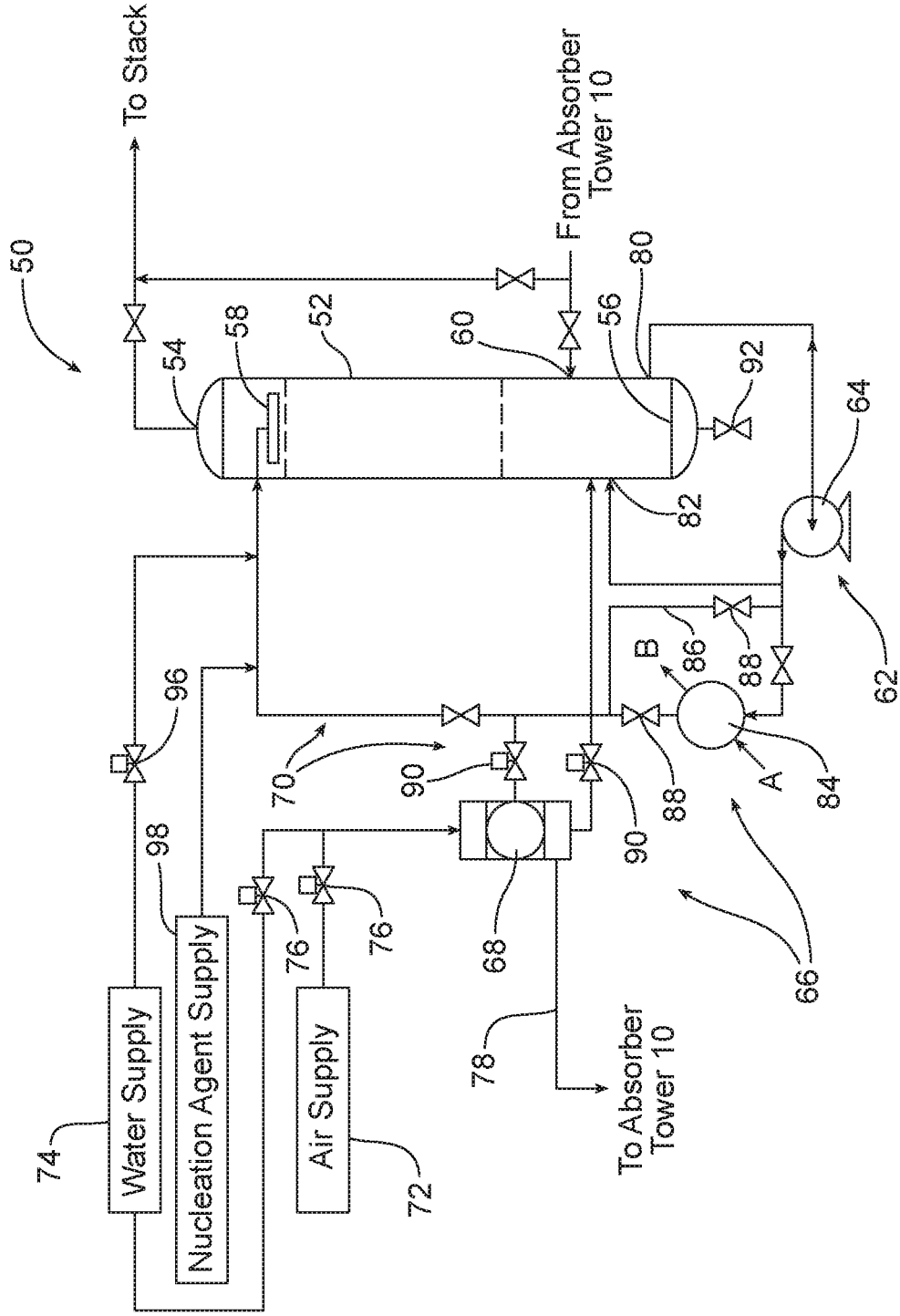
FIG. 2 is a schematic illustration of the new and improved apparatus for recovering an amine solvent from an acid gas stream exhausted or discharged from an absorber of the apparatus illustrated in FIG. 1.

Reference is now made to FIG. 2 illustrating the new and improved apparatus 50 for recovering an amine solvent from acid gas stream such as discharged from the top of the absorber tower 10 as illustrated at action arrow 30 in FIG. 1. The apparatus 50 includes a water wash recovery column 52 having a treated acid gas discharge port 54 at an upper end thereof and a sump 56 at a lower end thereof. The apparatus 50 also includes a nozzle 58 that is provided in the water wash recovery column 52 and adapted for spraying wash water and an amine nucleation agent into the water wash recovery column adjacent the upper end thereof. Further, the apparatus 50 includes an inlet port 60 adapted for introducing acid gas discharged from the absorber tower 10 into the water wash recovery column 50 adjacent the lower end thereof.

Advantageously, a counter-current flow is established in the water wash recovery column 52 between the acid gas introduced through the inlet port 60 and the water wash and amine nucleation agent sprayed from the nozzle 58. As the acid gas stream passes through the water wash recovery column 52, the nucleation agent serves as a nucleation site for the amine molecules. As a result, water wash, amine nucleation agent and entrained amine solvent is collected in the sump 56 and treated acid gas is discharged through the acid gas discharge port 54 at the top of the water wash recovery column.

More specifically, the apparatus 50 includes a sump recirculation circuit generally designated by reference numeral 62. That sump recirculation circuit 62 includes a pump 64 adapted for recirculating the water wash, the amine nucleation agent and the entrained amine solvent in the sump 56 at the bottom of the water wash recovery column 52 in order to prevent the amine nucleation agent from clumping and settling.

The apparatus 50 also includes a separating circuit, generally designated by reference numeral 66. More particularly, the separating circuit 66 includes a separating element 68, such as a screen or filter, that separates the amine nucleation agent from the wash water and the entrained amine solvent.

Still further, the apparatus 50 includes an amine nucleation agent return circuit, generally designated by reference numeral 70. The amine nucleation agent return circuit 70 functions to return the separated amine nucleation agent from the separating element 68 to the water wash recovery column 52 through the nozzle 58. More particularly, any buildup of the nucleation agent on the separator element 68 may be removed by directing a fluid stream of air from the air supply 72, a fluid stream of water from the water supply 74 or a fluid stream in the form of a combination of air and water from the two supplies through the valves 76 to whisk the amine nucleation agent from the separating element 68 toward the nozzle 58.

The apparatus 50 may also include a water wash and entrained amine solvent return circuit, generally designated by reference numeral 78, for delivering the water wash entrained solvent separated from the amine nucleation agent at the separating element 68 to the absorber 10 at action arrow 16.

The amine nucleation agent utilized in the apparatus 50 may have a density of 997 kg/m$^3$+/−600 kg/m$^3$ and a diameter less than 1 mm. Further, the amine nucleation agent may be provided at up to 15 weight percent in the water wash. In other embodiments, the amine nucleation agent may be provided at between 0.5 and 12 weight percent in the water wash. In one or more of the many possible embodiments of the apparatus 50, the amine nucleation agent is an activated carbon of less than 35 mesh. In one or more of the many possible embodiments of the apparatus 50, the amine nucleation agent is an activated carbon of about 325 mesh.

The apparatus 50 is useful in a new and improved method of recovering an amine solvent from an acid gas stream. That method may be broadly described as including the steps of: (a) treating the acid gas stream in a water wash recovery column 52 with a counter-current flow of water wash and an amine nucleation agent, (b) discharging treated acid gas from an upper end of the water wash recovery column through the acid gas discharge port 54 and (c) collecting water wash, amine nucleation agent and entrained amine solvent from the acid gas stream in the sump 56 at a lower end of the water wash recovery column 52.

The method may also include the step of recirculating the water wash, the amine nucleation agent and the entrained amine solvent in the sump 56 to prevent the amine nucleation agent from settling and clumping. This may be done utilizing the sump recirculation circuit 62 and the pump 64 so that the wash water, amine nucleation agent and entrained amine solvent is circulated from the sump 56 through the recirculation circuit outlet 80 past the pump 64 and then through the recirculation inlet 82 back into the sump 56.

The method may also include the step of periodically draining the wash water, the amine nucleation agent and the entrained amine solvent from the sump 56. This is then followed by the step of separating the amine nucleation agent from the wash water and the entrained amine solvent. More particularly, the wash water, the amine nucleation agent and the entrained amine solvent is drained through the outlet 80 and then forced by the pump 64 through the separating circuit 66 to the separating element 68. More particularly, the wash water, the amine nucleation agent and the entrained amine solvent may be directed through the heat exchanger 84 where the wash water, amine nucleation agent and entrained amine solvent are cooled by a cooling water supply (note action arrows A and B) or alternatively, pumped through the bypass line 86 through coordinated operation of the flow control valves 88 and 90 to the separating element 68.

The method may also include delivering the wash water and entrained amine solvent separated from the amine nucleation agent by the separating element 68 back to the absorber tower 10 through the water wash and entrained amine solvent return circuit 78.

Further, the method may include the step of removing any buildup of the amine nucleation agent on the separator element 68 with a fluid stream of air from the air supply 72 and/or water from the water supply 74 so that the amine nucleation agent is directed back to the nozzle 58 through the amine nucleation agent return circuit 70.

At any time, one may open the drain valve 92 at the bottom of the water wash recovery column 52 to drain wash water, amine nucleation agent and entrained amine solvent from the water wash recovery column 52. Any losses of wash water and amine nucleation agent may be made up by delivery of wash water from the water supply 74 past the valve 96 and a nucleation agent supply 98.

Example 1

An amine nucleation agent, in the form of an oven-oxidated 325 mesh activated carbon was added to wash water at 1 weight percent and used to recover amine solvent from an acid gas stream in a 0.1 MWth large bench scale carbon capture facility. The process solvent was made up of 45 weight percent amines and 65 weight percent water. The mean concentration, shown in FIG. 3, can be thought of as an average of amine concentrations over multiple days. This is why the drop in the mean concentration is gradual and not immediate.

Figure 3:
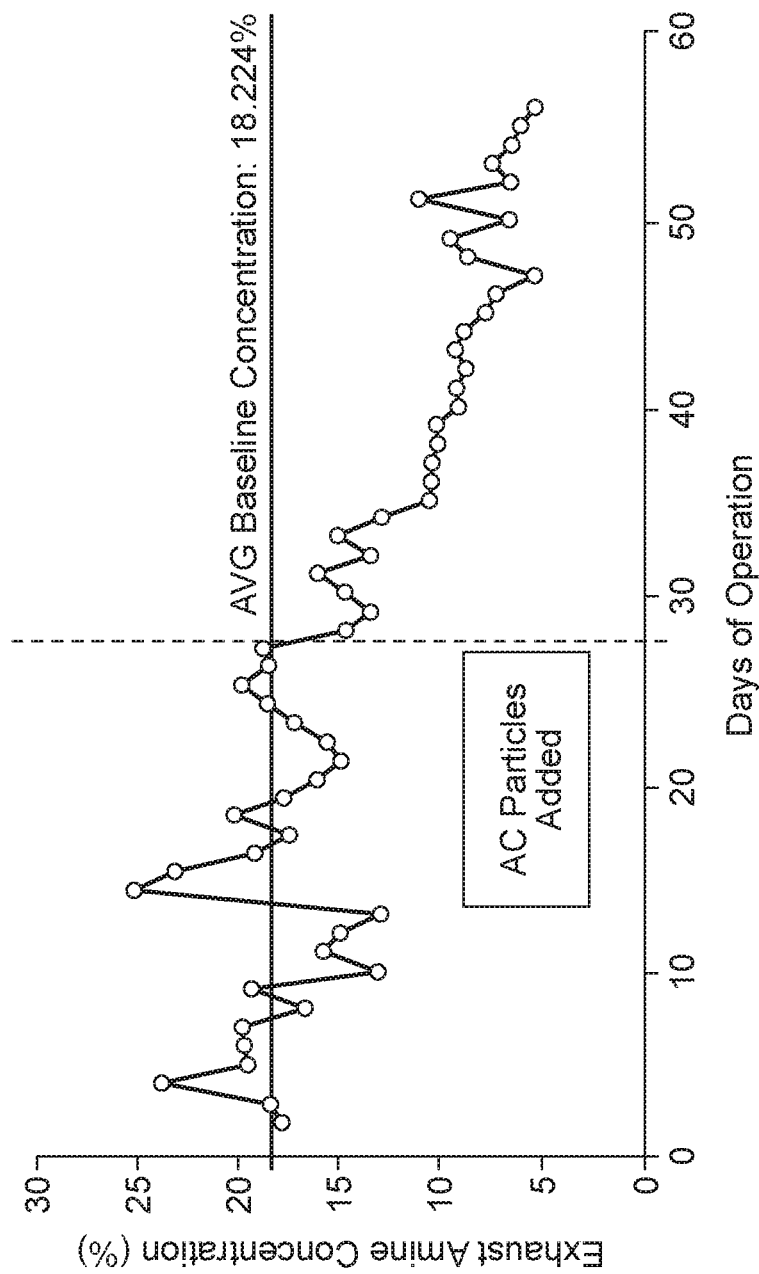
FIG. 3 is a graphic illustration plotting exhaust amine concentration versus days of operation and showing how an amine nucleation agent increases the efficiency of the removal of amine solvent from the acid gas stream.

Compared to the process solvent in the absence of any amine nucleation agent, the exhaust contains mostly water and a small amount of amine. This is because water molecules are lighter and therefore more easily pulled from the solvent and into the treated flue gases as the treated flue gases leave the absorber. FIG. 3 shows a reduction in amine concentration but total solvent recovered remained relatively unchanged. This is evidence that the activated carbon was serving as a nucleation site for amine molecules to adhere to and this is why there is a reduction in total amine concentration in the process exhaust.

Figure 4:
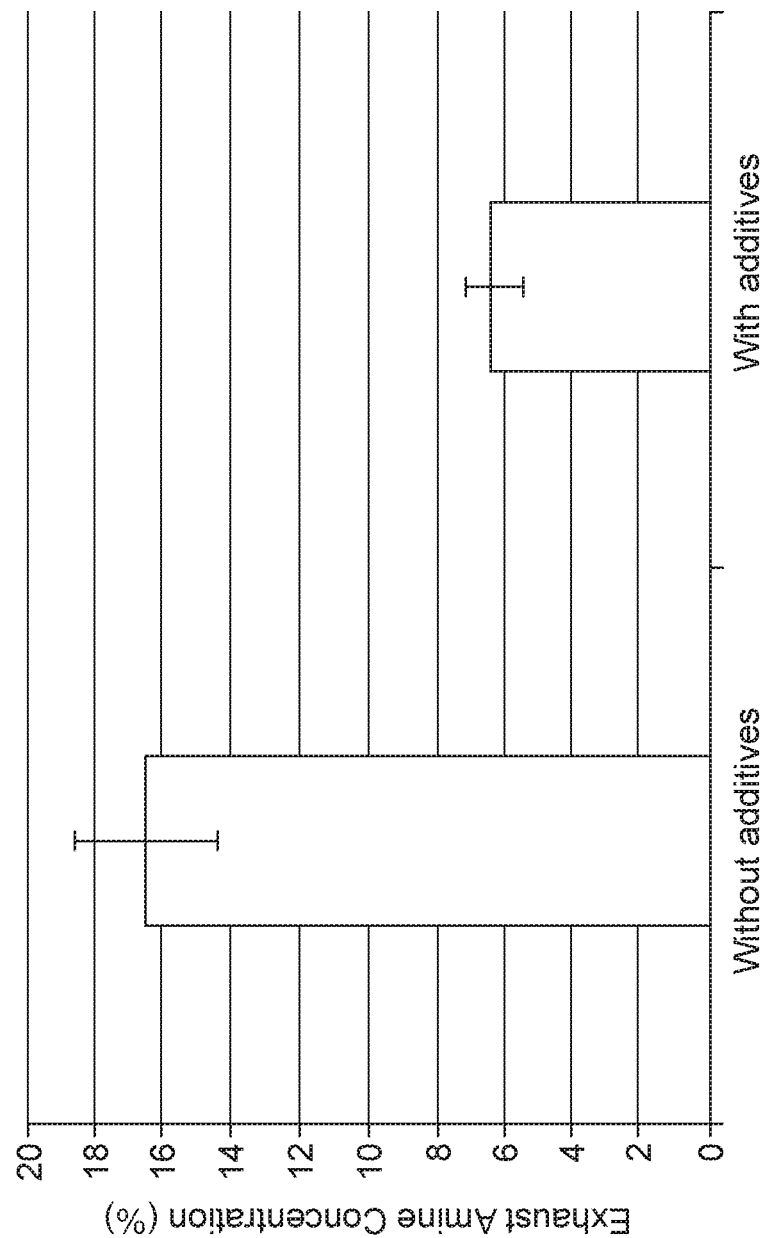
FIG. 4 is a plot of exhaust amine concentration showing how the addition of one weight percent of an oxidized 325 mesh activated carbon to the process solvent reduced the amine concentration in the acid gas exhausted from the absorber tower such as illustrated in FIG. 1.

The activated carbon amine nucleation agent was further tested for 500 operational hours. FIG. 4 illustrates that the activated carbon and amine nucleation agent reduced the overall amine exhaust emissions by 60% of the baseline emissions. Although the total solvent recovered remained relatively unchanged, the amount of costly amine recovery is significant. Samples of the recovered solvent were taken every six hours and analysis was done using ionic chromatography. The error bars in FIG. 4 represent a statistical standard deviation over the set of total measurements taken.

Overall, the efficiency of the water wash recovery column was increased by 60%. This 60% increase in efficiency greatly increases the recovery column's return on investment substantially reducing the cost of adding new amine solvent to the process. Further, the recovery provides a benefit to the local population and the environment. In addition, downstream exhaust handling equipment will also have less exposure to the corrosive amine solvent thereby increasing its service life.

The foregoing has been presented for purposes of illustration and description. It is not intended to be exhaustive or to limit the embodiments to the precise form disclosed. Obvious modifications and variations are possible in light of the above teachings. For example, the water wash recovery column 52 may include a packing material of a type known in the art to increase surface area and provide for better liquid gas contact. All such modifications and variations are within the scope of the appended claims when interpreted in accordance with the breadth to which they are fairly, legally and equitably entitled.

What is claimed:

1. A method of recovering an amine solvent from an acid gas stream, comprising:
    treating said acid gas stream in a water wash recovery column with a countercurrent flow of wash water and an amine nucleation agent;
    discharging treated acid gas from an upper end of the water wash recovery column; and collecting wash water, amine nucleation agent and entrained amine solvent from the acid gas stream in a sump at a lower end of the water wash recovery column.

2. The method of claim 1, including using as said amine nucleation agent an activated carbon having a density of 997 kg/m$^3$+/−600 kg/m$^3$ and a diameter less than 1.0 millimeter.

3. The method of claim 2, including recirculating the wash water, amine nucleation agent and entrained amine solvent in the sump to prevent the amine nucleation agent from settling and clumping.

4. The method of claim 3, including periodically draining the wash water, the amine nucleation agent and the entrained amine solvent from the sump.

5. The method of claim 4, including separating the amine nucleation agent from the wash water and the entrained amine solvent.

6. The method of claim 5, including delivering the wash water and entrained amine solvent to an absorber tower where the amine solvent captures carbon dioxide from the acid gas stream.

7. The method of claim 6, including returning the amine nucleation agent to the water wash recovery column.

8. The method of claim 7, including using activated carbon of less than 35 mesh as the amine nucleation agent.

9. The method of claim 7, including using up to 15 wt % amine nucleation agent in the wash water.

10. The method of claim 7, including separating the amine nucleation agent from the wash water and the entrained solvent with a separating element and removing build-up of the amine nucleation agent on the separator element with a fluid stream selected from a group including water, air or a combination thereof.

11. An apparatus for recovering an amine solvent from an acid gas stream, comprising:
  a water wash recovery column including a treated acid gas discharge port at an upper end and a sump at a lower end;
  a nozzle in the water wash recovery column spraying water wash and an amine nucleation agent into the water wash recovery column adjacent the upper end; and
  an inlet port introducing acid gas into the water wash recovery column adjacent the lower end whereby (a) a countercurrent flow is established between the acid gas introduced through the inlet port and the water wash and amine nucleation agent sprayed from the nozzle, (b) water wash, amine nucleation agent and entrained amine solvent is collected in the sump and (c) treated acid gas is discharged through the acid gas discharge port.

12. The apparatus of claim 11, further including a sump recirculation circuit including a pump recirculating the water wash, the amine nucleation agent and the entrained amine solvent in the sump to prevent the amine nucleation agent from clumping and settling.

13. The apparatus of claim 12, further including a separating circuit including a separating element that separates the amine nucleation agent from the wash water and the entrained amine solvent.

14. The apparatus of claim 13, further including an amine nucleation agent return circuit that returns the separated amine nucleation agent from the separating element to the water wash recovery column.

15. The apparatus of claim 14, further including a water wash and entrained amine solvent return circuit delivering the water wash and entrained solvent separated from the amine nucleation agent at the separating element to a downstream absorber tower where the amine solvent strips carbon dioxide from the acid gas.

16. The apparatus of claim 15, wherein the amine nucleation agent has a density of 997 kg/m$^3$+/−600 kg/m$^3$ and a diameter less than 1 millimeter.

17. The apparatus of claim 16, wherein the amine nucleation agent is provided at up to 15 wt % in the water wash.

18. The apparatus of claim 17, wherein the amine nucleation agent is an activated carbon of less than 35 mesh.

19. The apparatus of claim 17, wherein the amine nucleation agent is an activated carbon of 325 mesh.

* * * * *